United States Patent
Gaspar

(10) Patent No.: US 11,982,399 B1
(45) Date of Patent: May 14, 2024

(54) ELASTOMERIC MOUNT WITH BI-DIRECTIONAL AXIAL MOTION CONTROL AND RADIAL TRAVEL LIMITER

(71) Applicant: The Pullman Company, Milan, OH (US)

(72) Inventor: Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 4 days.

(21) Appl. No.: 17/990,788

(22) Filed: Nov. 21, 2022

(51) Int. Cl.
*F16M 13/02* (2006.01)

(52) U.S. Cl.
CPC ....... *F16M 13/02* (2013.01); *F16M 2200/025* (2013.01)

(58) Field of Classification Search
CPC ..... F16M 13/02; F16M 2200/025; F16F 7/00; F16F 15/00
USPC ......... 248/636; 267/141.2, 140.11, 153, 292, 267/293
See application file for complete search history.

(56) References Cited

U.S. PATENT DOCUMENTS

| | | | |
|---|---|---|---|
| 5,060,917 A * | 10/1991 | DuBos | F16F 13/10 267/140.13 |
| 6,082,717 A * | 7/2000 | Nanno | F16F 13/20 267/140.14 |
| 6,758,300 B2 | 7/2004 | Kromis et al. | |
| 6,843,472 B2 | 1/2005 | Henry, III et al. | |
| 7,510,043 B2 | 3/2009 | Cerri, III | |
| 7,644,911 B2 | 1/2010 | Rodecker | |
| 8,061,694 B2 * | 11/2011 | Sugimoto | F16F 13/101 267/140.13 |
| 8,066,266 B2 * | 11/2011 | Rodecker | F16F 1/3732 267/141.1 |
| 8,152,146 B2 | 4/2012 | Rodecker | |
| 8,356,806 B2 * | 1/2013 | Garety | F16F 13/108 267/140.13 |
| 8,366,069 B2 | 2/2013 | Rodecker | |
| 8,376,331 B2 | 2/2013 | Rodecker | |
| 8,608,117 B2 | 12/2013 | Rodecker | |
| 8,646,761 B2 | 2/2014 | Rodecker | |
| 9,650,939 B2 | 5/2017 | Rodecker | |
| 9,845,720 B2 | 12/2017 | Rodecker | |
| 10,030,569 B2 | 7/2018 | Rodecker | |
| 10,378,418 B2 | 8/2019 | Rodecker | |
| 10,718,253 B2 | 7/2020 | Rodecker | |
| 2003/0038414 A1 * | 2/2003 | Pizanti | F16F 13/103 267/140.13 |

(Continued)

*Primary Examiner* — Muhammad Ijaz
(74) *Attorney, Agent, or Firm* — Harness, Dickey & Pierce, P.L.C.

(57) ABSTRACT

An elastomeric mount comprises an elastomeric body defining a first annular void encircling an inner sleeve and extending in a first direction. The elastomeric body defines a second annular void extending in a second opposite direction. An outer sleeve surrounds and is spaced apart from the inner sleeve and directly engages the elastomeric body. A first ferrule is fixed to a first end of the inner sleeve, includes a stop face spaced apart from the elastomeric body, and is adapted to limit relative axial movement between the inner sleeve and the outer sleeve in a first direction. A second ferrule is attached to the inner sleeve, includes a stop face spaced apart from the elastomeric body, and it adapted to limit relative movement between the inner sleeve and the outer sleeve in a second opposite direction.

20 Claims, 4 Drawing Sheets

(56) References Cited

U.S. PATENT DOCUMENTS

| | | | |
|---|---|---|---|
| 2008/0246199 A1* | 10/2008 | Siemer | F16F 13/10 267/140.5 |
| 2009/0174127 A1* | 7/2009 | Sugimoto | F16F 13/101 267/140.13 |
| 2012/0126090 A1* | 5/2012 | Kojima | F16F 13/1463 248/636 |
| 2014/0265074 A1* | 9/2014 | Goossens | F16F 13/085 267/140.13 |

* cited by examiner

ELASTOMERIC MOUNT WITH BI-DIRECTIONAL AXIAL MOTION CONTROL AND RADIAL TRAVEL LIMITER

FIELD

The present disclosure relates to an elastomeric mount for attaching a component to a vehicle. More particularly, the present disclosure relates to an elastomeric mount operable to bi-directionally limit axial travel while concurrently including an internal radial travel limiter.

BACKGROUND

The statements in this section merely provide background information related to the present disclosure and may not constitute prior art.

Vehicles are typically designed with a prime mover as the source of motive power to propel the vehicle. Prime movers may range in construction from internal combustion engines, hydraulically stored energy devices, electric motors, and various combinations or hybrid versions of the same. It is generally desirable to isolate vibrations generated by the prime mover from the chassis of the vehicle or a body of the vehicle. Engine mounts or motor mounts may include a metallic mounting bracket mounted to the engine or motor and another metallic bracket fixed to the frame of the vehicle. An elastomer may be positioned between the two metal mounting brackets. The elastomer provides a dampening function to minimize transfer of vibrations from the engine or motor to the remainder of the vehicle.

Many existing motor mounts include a solid, uninterrupted block of elastomer positioned between the mounting brackets. While such an arrangement has performed satisfactorily in the past, such designs do not allow a vehicle designer an opportunity to vary the load transfer and dampening characteristics of the mount in different loading directions. More particularly, it may be desirable to provide an engine or motor mount having a first set of damping, load transfer, and travel limiting characteristics in an axial direction while concurrently providing a different set of mechanical characteristics for limiting relative movement between the engine and the frame in the radial direction.

SUMMARY

An elastomeric mount comprises an elastomeric body defining a first annular void encircling an inner sleeve and extending in a first direction. The elastomeric body defines a second annular void extending in a second opposite direction. An outer sleeve surrounds and is spaced apart from the inner sleeve and directly engages the elastomeric body. A first ferrule is fixed to a first end of the inner sleeve, includes a stop face spaced apart from the elastomeric body, and is adapted to limit relative axial movement between the inner sleeve and the outer sleeve in a first direction. A second ferrule is attached to the inner sleeve, includes a stop face spaced apart from the elastomeric body, and it adapted to limit relative movement between the inner sleeve and the outer sleeve in a second opposite direction.

In another arrangement, an elastomeric mount comprises an inner sleeve including a first end and an opposite second end. An elastomeric body is disposed around and directly engages the inner sleeve. The elastomeric body defines a first annular void encircling the inner sleeve. The first annular void extends in a first direction into the elastomeric body from the first end. The elastomeric body defines a second annular void encircling the inner sleeve. The second annular void extends in a second direction opposite to the first direction into the elastomeric body from the second end. The first annular void axially overlaps the second annular void. An outer sleeve is disposed around the inner sleeve and the elastomeric body. The outer sleeve is spaced apart from the inner sleeve and directly engages the elastomeric body. The outer sleeve includes a first end having a radially inwardly extending end wall and an opposite second end having a radially outwardly extending flange. A first ferrule is fixed to the first end of the inner sleeve. The first ferrule includes a first stop face spaced apart from the elastomeric body and adapted to limit relative axial movement between the inner sleeve and the outer sleeve in the first direction. The elastomeric body includes a portion axially positioned between the end wall and the first stop face of the first ferrule. A second ferrule is fixed to the second end of the inner sleeve. The second ferrule includes a second stop face spaced apart from the elastomeric body and adapted to limit relative axial movement between the inner sleeve and the outer sleeve in the second direction opposite to the first direction. The elastomeric body includes a portion axially positioned between the flange and the second stop face of the second ferrule.

BRIEF DESCRIPTION OF THE DRAWINGS

The drawings described herein are for illustrative purposes only of select embodiments and not all possible implementations and are not intended to limit the scope of the present disclosure.

Corresponding reference numerals indicate corresponding parts throughout the several views of the drawings.

DETAILED DESCRIPTION

Figure 1:
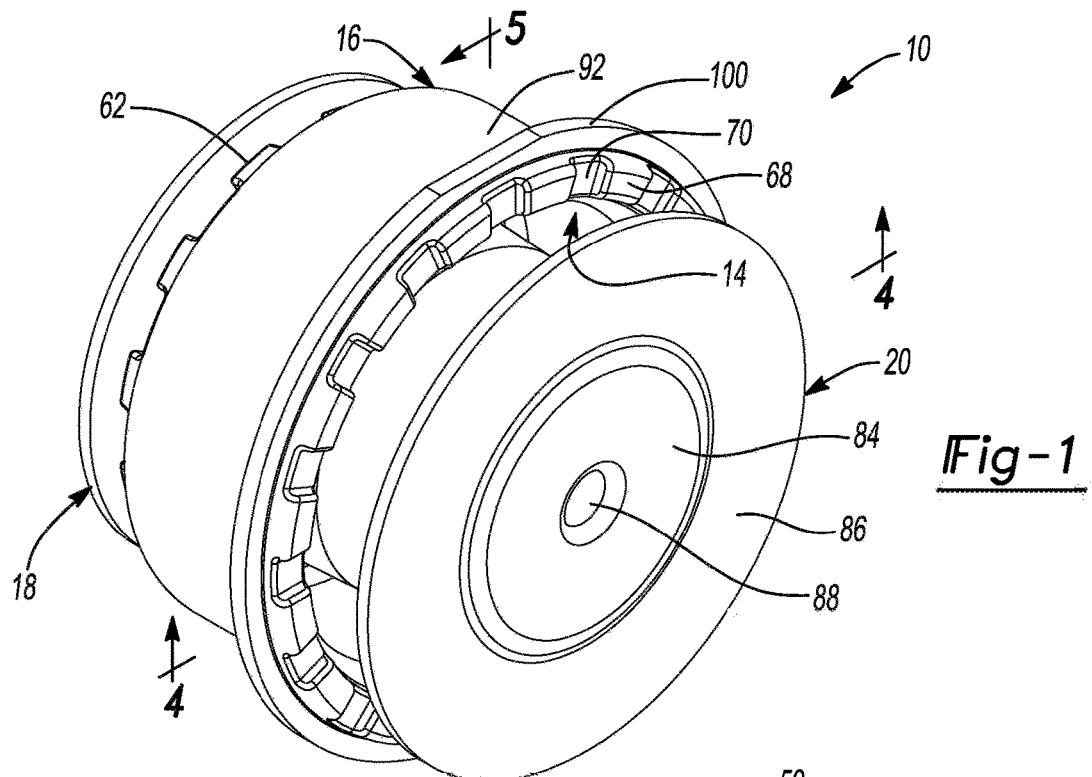
FIG. 1 is a perspective view of an exemplary elastomeric mount constructed in accordance with teachings of the present disclosure.
Figure 2:
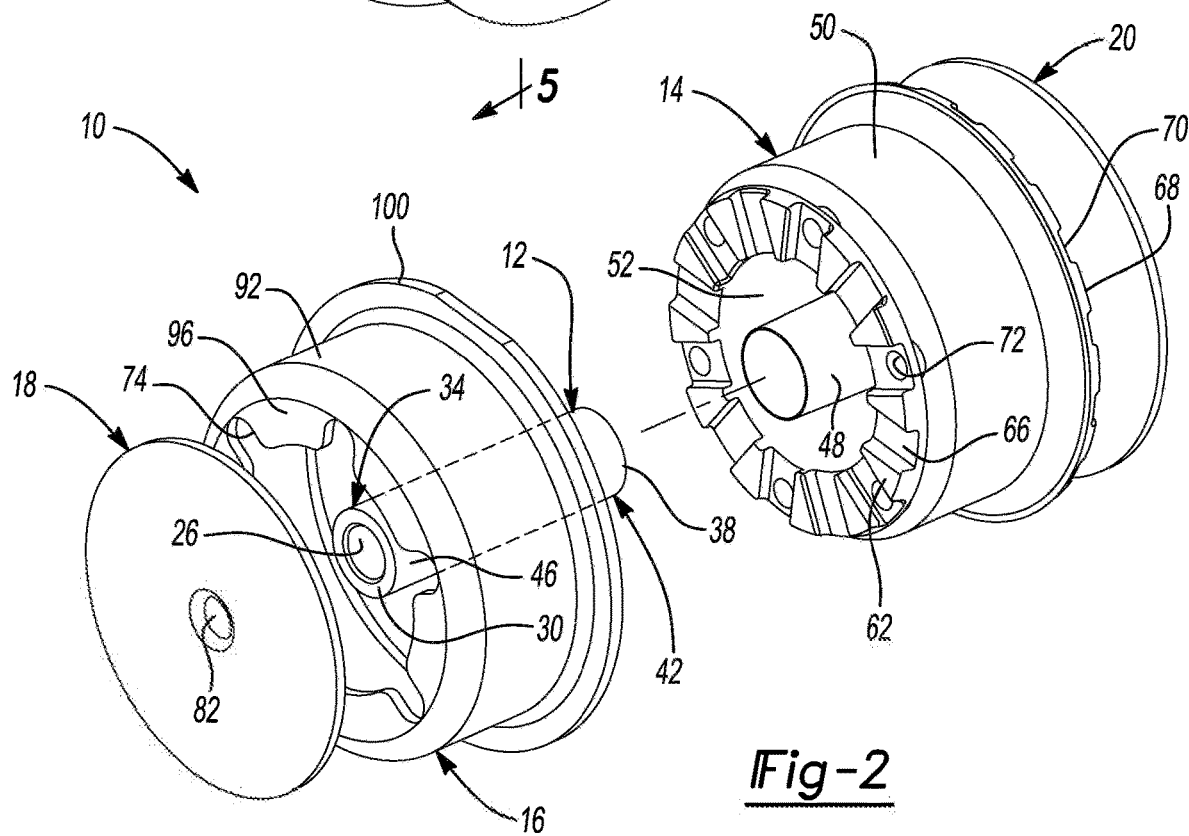
FIG. 2 is an exploded perspective view of the elastomeric mount depicted in FIG. 1.
Figure 3:
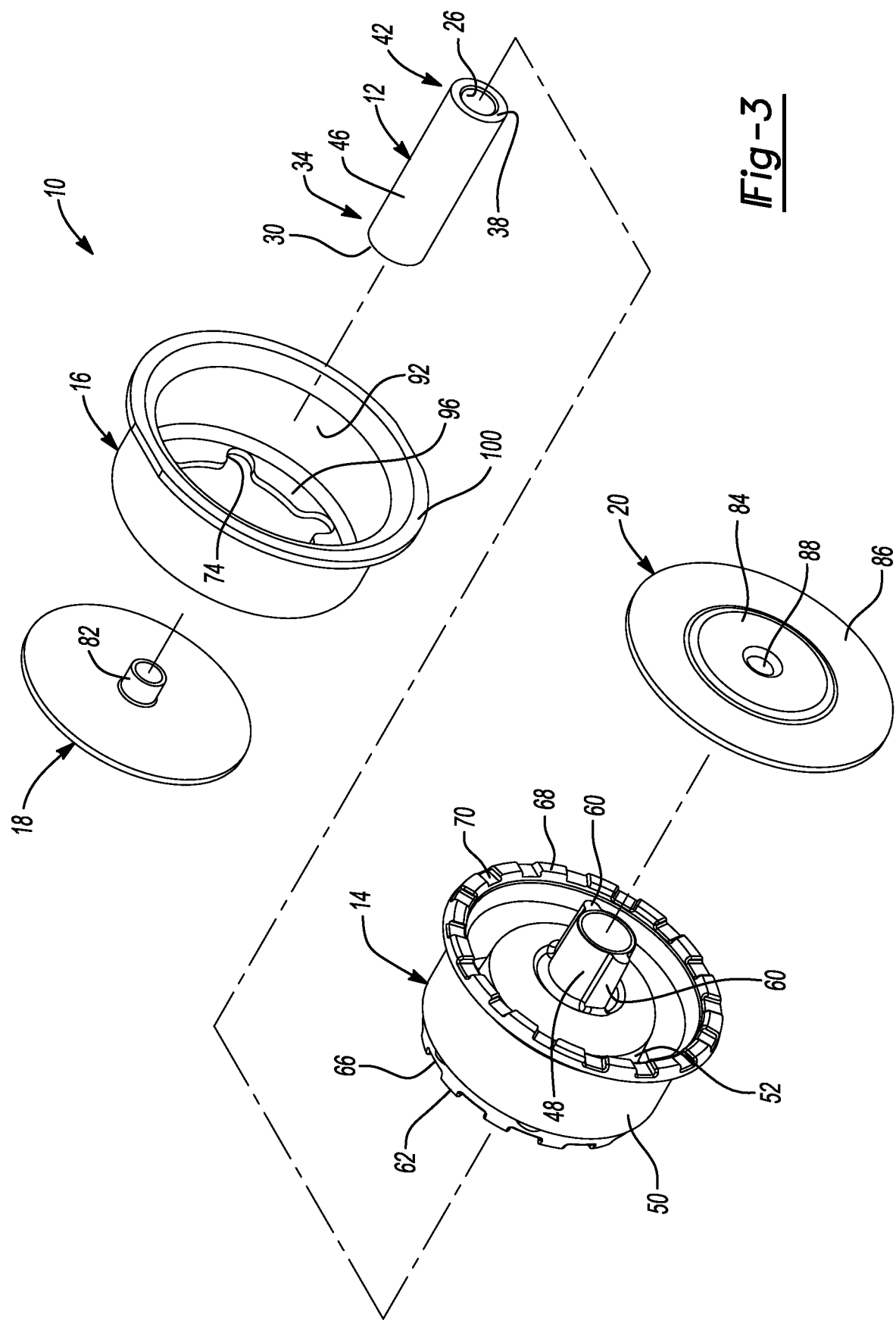
FIG. 3 is another exploded perspective view of the elastomeric mount.

An exemplary embodiment elastomeric mount will now be described more fully with reference to the accompanying drawings with the elastomeric mount being identified at reference 10.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, elastomeric mount 10 is an assembly comprising an inner sleeve 12, an elastomeric body 14, an outer sleeve 16, a first ferrule 18, and a second ferrule 20. Inner sleeve 12 is illustrated as a metal tube having a generally circular cylindrical shape. It is also within the scope of the present disclosure to construct inner sleeve 12 as a solid cylindrical component. In the embodiment shown in the figures, inner sleeve 12 includes a substantially cylindrical through bore, having an inner surface 26, extending along a longitudinal axis 28. Inner sleeve 12 includes a first end face 30 positioned at a first end 34 and a second end face 38 positioned at a second end 42 opposite first end 34. Inner sleeve 12 includes a cylindrical outer surface 46. It is contemplated that inner sleeve 12 may be constructed from a low carbon steel such as SAE 1008 or SAE 1010. Alternatively, inner sleeve 12 may be constructed from an aluminum alloy or possibly plastic.

Figure 4:
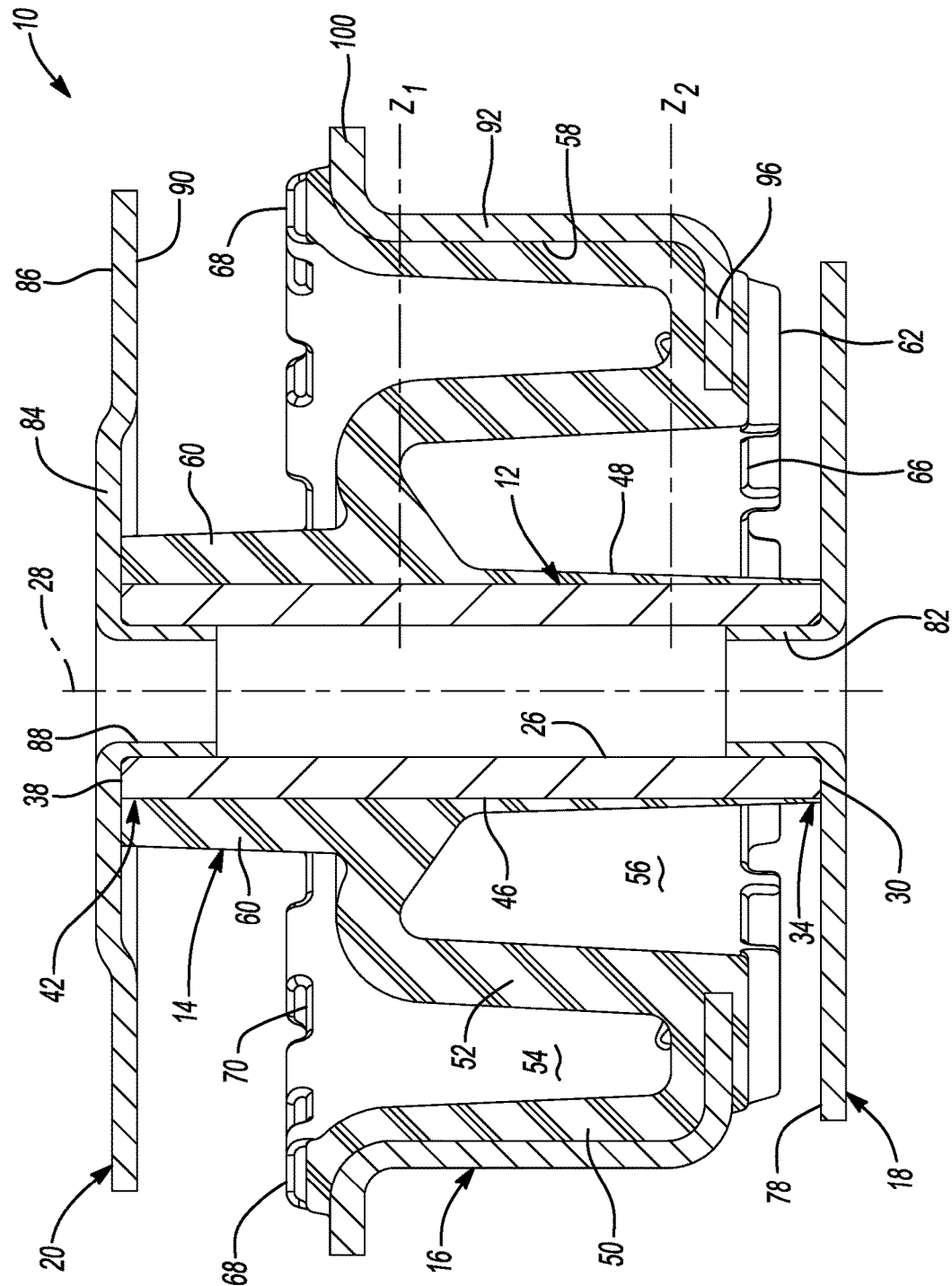
FIG. 4 is a cross-sectional view through the elastomeric mount.

Elastomeric body 14 includes an inner portion 48, an outer portion 50, a shear hub portion 52, an outer circumferential void 54 and an inner circumferential void 56. While voids 54 and 56 are illustrated as being symmetrically positioned with respect to inner sleeve 12, it is within the scope of the present disclosure to have voids 54 and 56 positioned asymmetrically with respect to inner sleeve 12. The geometrical features of the voids, particularly their thickness will determine the amount of travel allowable until the rate of the mount dramatically increases at the time the voids are closed. Before the voids are collapsed or closed, the radial loads impart shear loading on shear hub portion 52 regardless of the loading direction. The mechanical properties of elastomeric mount 10 may be tuned for target rate and deflection characteristics. As is shown in FIG. 4, void 54 axially overlaps void 56 in the zone bounded by phantom lines $Z_1$ and $Z_2$. The larger the overlap between voids 54 and 56, the lower the stiffness of elastomeric mount 10. At a certain magnitude of load, one or both of voids 54 and 56 are collapsed and compressive stresses are imparted from inner sleeve 12 and outer sleeve 16 to elastomeric body 14.

Inner portion 48, outer portion 50 and shear hub portion 52 of elastomeric body 14 are integrally constructed with one another such that elastomeric body 14 is a one-piece monolithic elastomer. Elastomeric body 14 may be constructed from a natural rubber or other elastomer operable to provide a damping function for loads applied to elastomeric mount 10. Inner portion 48 in substantially cylindrically shaped with a tapered cross section reducing in thickness as inner portion 48 extends from the middle of elastomeric mount 10 toward first end 34. Inner portion 48 may include radially outwardly extending lugs 60 having an increased thickness at one end proximate second end 42 of inner sleeve 12. Lugs 60 serve to form a location to inject the natural rubber into the part during injection molding process. Elastomeric body 14 is bonded to outer surface 46 of inner sleeve 12. The taper is optional but may be provided as a beneficial manufacturing draft angle allowing easy removal of the bonded inner sleeve and elastomeric body 14 assembly from an injection molding die into which molten elastomer is injected.

FIG. 4 depicts elastomeric body 14 extending the entire axial extent of inner sleeve 12 from first end face 30 to second end face 38. It should be appreciated, however, that a complete coverage of outer surface 46 need not be required. Outer portion 50 of elastomeric body 14 is bonded to an inner surface 58 of outer sleeve 16.

Elastomeric body 14 also includes a first plurality of circumferentially spaced apart castellations 62 positioned proximate first ferrule 18. A plurality of circumferentially spaced apart recesses 66 are interdigitated with first set of castellations 62. On the opposite axial end of elastomeric body 14, a second set of castellations 68 axially extend. A corresponding second set of recesses 70 are alternately arranged with castellations 68. First set of castellations 62 and second set of castellations 68 function as springs when elastomeric body 14 is loaded into contact with one of first ferrule 18 or second ferrule 20.

Figure 5:
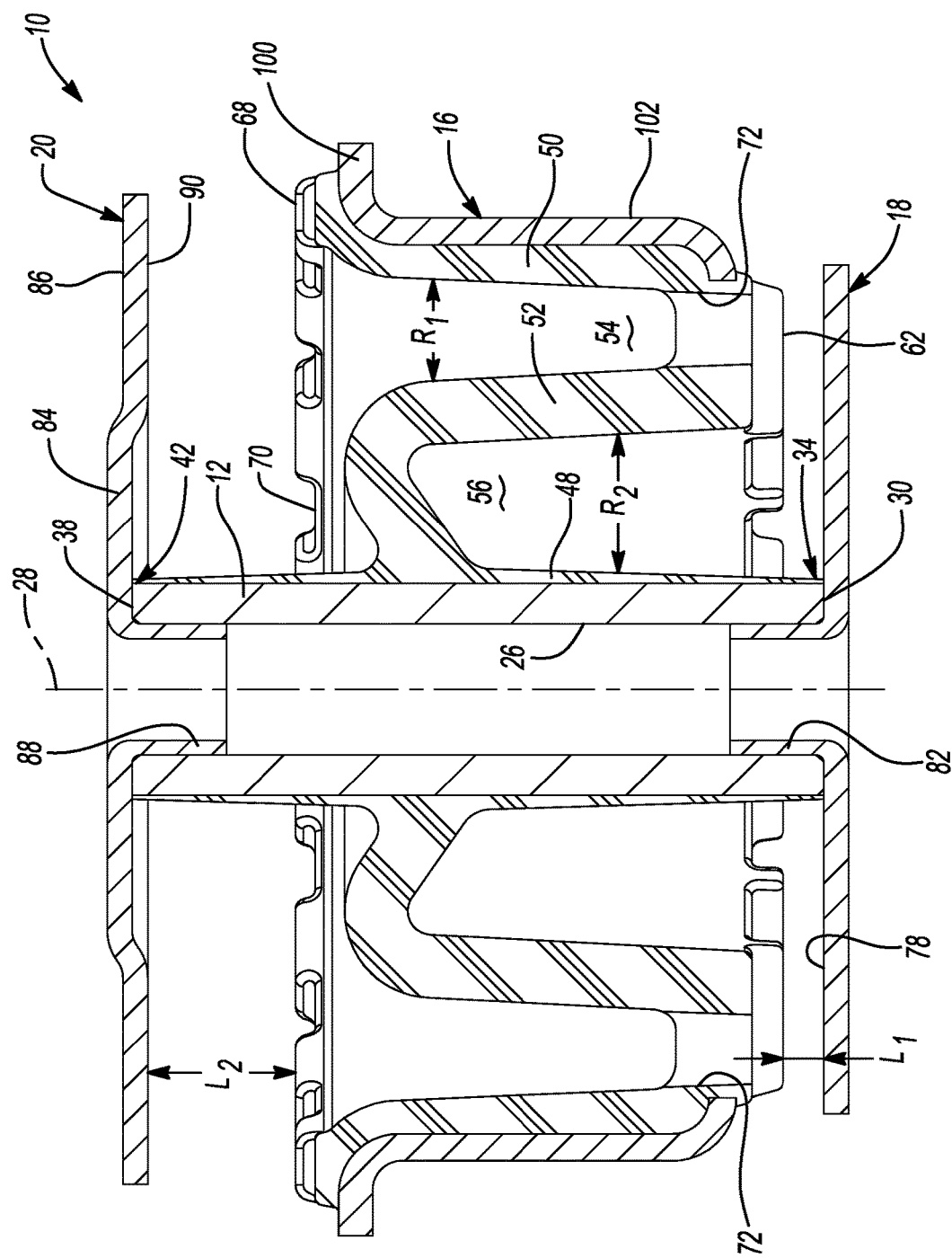
FIG. 5 is a cross-sectional view through the elastomeric mount at drain holes.

FIG. 5 depicts different geometrical features as the cross-sectional view is taken through recesses 66. It is contemplated that elastomeric mount 10 will be vertically mounted with longitudinal axis 28 extending substantially perpendicularly to a ground surface over which a vehicle may travel. To assure that water, contamination, or other debris does not become an impairment to the function of elastomeric mount 10, a plurality of drain holes 72 extend through elastomeric body 14. Outer sleeve 16 includes circumferentially spaced apart slots 74 that are aligned with drain holes 72 to allow liquid to pass from one side of elastomeric body 14 to the other.

First ferrule 18 may be shaped as a circular flat plate with having a first stop face 78 selectively engageable with first set of castellations 62. First ferrule 18 is fixed to inner sleeve 12 at first end 34. In the embodiment illustrated, first ferrule 18 includes an integrally formed axially protruding mounting tube 82. Mounting tube 82 is sized and shaped to engage inner surface 26 of inner sleeve 12 in a press fit arrangement. Mounting tube 82 may be drawn from a flat plate and elongated such that a wall thickness of mounting tube 82 is less than a thickness of the circular plate of first ferrule 18. By extruding mounting tube 82 in this manner, it may be a more simplified process to press fit mounting tube 82 to inner sleeve 12. First stop face 78 abuts first end face 30. First ferrule 18 may be constructed from a high strength low alloy steel, carbon steel, aluminum or the like.

Second ferrule 20 is substantially similar to first ferrule 18. As depicted in the figures, either of the ferrules may include other geometrical shapes to facilitate mounting or positional locating. For instance, second ferrule 20 includes a raised central portion 84 and a circumferentially extending outer and planar portion 86. Second ferrule 20 also includes a mounting tube 88 that is sized and shaped for a press fit engagement with inner surface 26 of inner sleeve 12. A second stop face 90 is selectively engageable with second set of castellations 68.

Outer sleeve 16 is a cup-shaped member including a cylindrical sidewall 92, a radially inwardly extending end wall 96, and a radially outwardly extending flange 100. As previously noted, elastomeric body 14 is bonded to an inner surface 58 of outer sleeve 16. A portion of flange 100, however, is not in contact with elastomeric body 14. Radially inwardly extending end wall 96 is at least partially encapsulated by elastomeric body 14.

At installation of elastomeric mount 10 within a vehicle, it is contemplated that an outer surface 102 of cylindrical sidewall 92 is press fit within a bore or a pocket of a frame or body member of the vehicle. Elastomeric mount 10 may be axially translated during vehicle installation until flange 100 acts as a seat to define the installed position of the elastomeric mount. It should be appreciated that other elastomeric mounts constructed in accordance with the teachings of this disclosure do not require flange 100.

Should a user desire to implement elastomeric mount 10 as an engine or motor mount, it is contemplated that one or both of first ferrule 18 and second ferrule 20 are in direct contact with an engine mounting member. A threaded fastener such as a cap screw (not shown) may be positioned to extend along longitudinal axis 28 through mounting tube 82, inner sleeve 12, and mounting tube 88. The cap screw mechanically couples the engine or motor to inner sleeve 12. Elastomeric body 14 functions as a damper between the component or components fixed to inner sleeve 12 and the component or components fixed to outer sleeve 16.

First ferrule 18 and second ferrule 20 each provide an axial travel limiting function. In the figures, elastomeric mount 10 is shown in a free, unloaded state prior to installation in a vehicular application. In the unloaded state, first ferrule 18 is spaced apart from first set of castellations 62 a distance $L_1$. Second ferrule 20 is spaced apart from second set of castellations 68 a distance $L_2$. In the exemplary embodiment depicted in this paper, distance $L_1$ is less than $L_2$. Depending on the application, $L_1$ may equal $L_2$ or $L_1$ may be greater than $L_2$. It should also be appreciated that $L_1$ and $L_2$ may intentionally change during the installation of elastomeric mount 10 into a vehicle. For example, the weight of the engine or a portion thereof may be supported by inner sleeve 12 and reacted by outer sleeve 16 on a different vehicular member. If elastomeric mount 10 were mounted vertically relative to ground as depicted in FIG. 5, $L_2$ would decrease while $L_1$ increases to account for the mass of the supported member on inner tube 12. The extent of axial motion of first ferrule 18 toward elastomeric body 14 is limited by the magnitude of $L_1$. Similarly, second ferrule 20 may axially translate toward elastomeric body 14 a maximum of distance equal to $L_2$. First ferrule 18 and second ferrule 20 acting as axial travel limiters function to limit the maximum stress applied to elastomeric body 14.

Damping characteristics of elastomeric mount 10 may be tailored "tuned" for a particular customers application by defining the magnitude of $L_1$ and $L_2$. Damping characteristics of elastomeric mount 10 may be further defined by varying the thickness or length of inner portion 48, outer portion 50 or shear hub portion 52. A length of inner sleeve 12 may be varied to predefine different axial travel limiting parameters varying $L_1$ and $L_2$. When first ferrule 18 and second ferrule 20 are spaced apart from elastomeric body 14, elastomeric mount 10 will exhibit a soft or otherwise relatively compliant damping characteristic. Once one of the first ferrule 18 or second ferrule 20 engages its associated set of castellations 62,68, elastomeric mount 10 will exhibit much more rigid load reaction characteristics.

Elastomeric mount 10 is also equipped with a radial travel limiter. The size and shape of voids 54 and 56 will define the extent to which inner sleeve 12 may move radially relative to outer sleeve 16. A first radial spacing $R_1$ is provided between outer portion 50 and shear hub portion 52. A second radial spacing $R_2$ is provided between inner portion 48 and shear hub portion 52. Maximum radial relative movement between inner sleeve 12 and outer sleeve 16 will occur if both of the radial spacings are reduced to zero or otherwise minimized. Accordingly, the radial travel limit may be varied by varying the thickness of inner portion 48, outer portion 50, or shear hub portion 52. The outer diameter of inner sleeve 12 and the diameter of sidewall 92 also contribute to the maximum extent or radial travel allotted.

A majority of inner portion 48, outer portion 50, and shear hub portion 52 of elastomeric body 14 are circumscribed by outer sleeve 16. The radial extent of first ferrule 18 and second ferrule 20 are substantially the same as cylindrical sidewall 92 of outer sleeve 16. This geometrical arrangement provides protection to elastomeric body 14 from contamination or impact with objects in the environment that may cause damage to the elastomer. It should be appreciated that while elastomeric mount 10 has been described as having a vertical orientation with longitudinal axis 28 extending perpendicular to a ground surface, any number of other orientations relative to ground are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Modifications and variations of the present disclosure are possible in light of the above teachings and may be practiced otherwise than as specifically described while within the scope of the appended claims.

What is claimed is:

1. An elastomeric mount comprising:
   an inner sleeve including a first end and an opposite second end;
   an elastomeric body disposed around and directly engaging the inner sleeve, the elastomeric body defining a first annular void encircling the inner sleeve, the first annular void extending in a first direction into the elastomeric body from the first end, the elastomeric body defining a second annular void encircling the inner sleeve, the second annular void extending in a second direction opposite to the first direction into the elastomeric body from the second end, the first annular void overlapping the second annular void;
   an outer sleeve disposed around the inner sleeve and the elastomeric body, the outer sleeve being spaced apart from the inner sleeve and directly engaging the elastomeric body, the outer sleeve including a first end and an opposite second end;
   a first ferrule fixed to the first end of the inner sleeve, the first ferrule including a stop face spaced apart from the elastomeric body and adapted to limit relative axial movement between the inner sleeve and the outer sleeve in the first direction; and
   a second ferrule fixed to the second end of the inner sleeve, the second ferrule including a stop face spaced apart from the elastomeric body and adapted to limit relative axial movement between the inner sleeve and the outer sleeve in the second direction opposite to the first direction.

2. The elastomeric mount according to claim 1, wherein radial movement of the outer sleeve relative to the inner sleeve is limited by the first and second annular voids.

3. The elastomeric mount according to claim 1, wherein the inner sleeve is a hollow cylindrically-shaped one-piece monolithic component.

4. The elastomeric mount according to claim 1, wherein the elastomeric body is bonded to the inner sleeve.

5. The elastomeric mount according to claim 1, wherein the inner sleeve is coaxially aligned with the outer sleeve.

6. The elastomeric mount according to claim 1, wherein the inner sleeve axially extends beyond the outer sleeve at each end of the outer sleeve.

7. The elastomeric bushing according to claim 1, wherein a load attempting to axially move the outer sleeve and the inner sleeve relative to one another is firstly reacted by the elastomeric body and subsequently by the first ferrule after a space between the first ferrule and the elastomeric body is eliminated.

8. The elastomeric mount according to claim 7, wherein a load attempting to axially move the outer sleeve and the inner sleeve relative to one another is firstly reacted by the elastomeric body and subsequently by the second ferrule after a space between the second ferrule and the elastomeric body is eliminated.

9. The elastomeric mount according to claim 1, wherein an inner surface of the outer sleeve is bonded to the elastomeric body.

10. The elastomeric mount according to claim 1, wherein the outer sleeve includes a flange radially extending parallel to the second ferrule.

11. The elastomeric mount according to claim 10, wherein the elastomeric body includes axially extending and circumferentially spaced apart castellations positioned proximate the flange and adapted to engage the second ferrule.

12. The elastomeric mount according to claim 1, wherein the first ferrule and the second ferrule extend parallel to one another.

13. The elastomeric mount according to claim 1, wherein the elastomeric body includes an aperture to allow water to flow therethrough.

14. An elastomeric mount comprising:
    an inner sleeve including a first end and an opposite second end;
    an elastomeric body disposed around and directly engaging the inner sleeve, the elastomeric body defining a first annular void encircling the inner sleeve, the first annular void extending in a first direction into the elastomeric body from the first end, the elastomeric body defining a second annular void encircling the inner sleeve, the second annular void extending in a second direction opposite to the first direction into the elastomeric body from the second end, the first annular void axially overlapping the second annular void;
    an outer sleeve disposed around the inner sleeve and the elastomeric body, the outer sleeve being spaced apart from the inner sleeve and directly engaging the elastomeric body, the outer sleeve including a first end having a radially inwardly extending end wall and an opposite second end having a radially outwardly extending flange;
    a first ferrule fixed to the first end of the inner sleeve, the first ferrule including a first stop face spaced apart from the elastomeric body and adapted to limit relative axial movement between the inner sleeve and the outer sleeve in the first direction, wherein the elastomeric body includes a portion axially positioned between the end wall and the first stop face of the first ferrule; and
    a second ferrule fixed to the second end of the inner sleeve, the second ferrule including a second stop face spaced apart from the elastomeric body and adapted to limit relative axial movement between the inner sleeve and the outer sleeve in the second direction opposite to the first direction, wherein the elastomeric body includes a portion axially positioned between the flange and the second stop face of the second ferrule.

15. The elastomeric mount according to claim 14, wherein radial movement of the outer sleeve relative to the inner sleeve is limited by the first and second annular voids.

16. The elastomeric mount according to claim 14, wherein the inner sleeve is a hollow cylindrically-shaped one-piece monolithic component.

17. The elastomeric mount according to claim 14, wherein the inner sleeve axially extends beyond the outer sleeve at each end of the outer sleeve.

18. The elastomeric bushing according to claim 14, wherein a load attempting to axially move the outer sleeve and the inner sleeve relative to one another is firstly reacted by the elastomeric body and subsequently by the first ferrule after a space between the first ferrule and the elastomeric body is eliminated.

19. The elastomeric mount according to claim 18, wherein a load attempting to axially move the outer sleeve and the inner sleeve relative to one another is firstly reacted by the elastomeric body and subsequently by the second ferrule after a space between the second ferrule and the elastomeric body is eliminated.

20. The elastomeric mount according to claim 14, wherein the portion of the elastomeric body axially positioned between the end wall and the first stop face of the first ferrule includes axially extending and circumferentially spaced apart castellations.

\* \* \* \* \*